United States Patent [19]

Asano

[11] 4,061,929

[45] Dec. 6, 1977

[54] CIRCUIT FOR OBTAINING DC VOLTAGE HIGHER THAN POWER SOURCE VOLTAGE

[75] Inventor: Kazuhiro Asano, Tokyo, Japan

[73] Assignee: Kabushiki Kaisha Daini Seikosha, Japan

[21] Appl. No.: 725,265

[22] Filed: Sept. 21, 1976

[30] Foreign Application Priority Data

Sept. 22, 1975 Japan .............................. 50-114548
Sept. 23, 1975 Japan .............................. 50-115210

[51] Int. Cl.$^2$ ........................ H03K 1/14; G04C 3/00
[52] U.S. Cl. .............................. 307/246; 58/23 BA; 307/264; 307/296 A; 307/DIG. 1; 307/DIG. 4; 363/60
[58] Field of Search ............... 307/296, 221 C, 224 C, 307/225 C, 246, 251, 270, 264, DIG. 1, DIG. 4; 58/23 A, 23 BA, 23 D, 50 R; 321/15; 328/176

[56] References Cited

U.S. PATENT DOCUMENTS

| 3,639,787 | 2/1972 | Lee | 307/DIG. 1 X |
| 3,900,743 | 8/1975 | Weimer | 307/DIG. 1 X |
| 3,900,747 | 8/1975 | Yamazaki et al. | 307/221 C X |
| 3,955,353 | 5/1975 | Astle | 58/23 BA |
| 3,988,617 | 10/1976 | Price | 307/DIG. 4 X |

OTHER PUBLICATIONS

Cassani, "Low-Voltage to High-Voltage Translator"; *IBM Tech. Discl. Bull.*, vol. 17, No. 12, pp. 3541–3542; May, 1975.

Primary Examiner—John S. Heyman
Assistant Examiner—Larry N. Anagnos
Attorney, Agent, or Firm—Robert E. Burns; Emmanuel J. Lobato; Bruce L. Adams

[57] ABSTRACT

A voltage boosting circuit comprises a plurality of units connected in sequence and each composed of a condenser and a plurality of MOS-FETs without any transformer or diode. The boosting circuit lends itself to miniaturization by integrated circuit technique.

7 Claims, 8 Drawing Figures

CIRCUIT FOR OBTAINING DC VOLTAGE HIGHER THAN POWER SOURCE VOLTAGE

FIELD OF INVENTION

The present invention relates to a voltage boosting circuit and particularly a circuit that can be miniaturized by integrated circuit techniques.

BACKGROUND OF INVENTION

The conventional voltage boosting circuit employing a transformer, diode and condenser is very difficult to miniaturize by integrated circuit techniques. Therefore, the space requirements of the conventional voltage boosting circuit make it unsuitable for use where small size is required, for example in a wristwatch or hand held calculator. Furthermore, the cost of the circuit elements comprising a transformer and diode is high so that the cost of an electronic watch or calculator utilizing the voltage boosting circuit is correspondingly high.

SUMMARY OF INVENTION

The present invention aims to eliminate the above noted disadvantages by providing a voltage boosting circuit which can readily be miniaturized by integrated circuit techniques. In accordance with the invention, the voltage boosting circuit comprises a plurality of units which are connected in sequence and each comprises a condenser and a plurality of MOS-FETs. As the voltage boosting circuit in accordance with the invention does not require any transformers or diodes it can be incorporated in integrated circuitry so as to be suitable for use in a small sized electronic watch or calculator. The desired boosting magnification is attained by employing a plurality of the boosting units connected in sequence with the output voltage of one unit applied as the input voltage of the next unit.

BRIEF DESCRIPTION OF DRAWINGS

The above mentioned and further objects, features and advantages of the present invention will become more apparent from the following description when taken in connection with the accompanying drawings in which.

DESCRIPTION OF PREFERRED EMBODIMENTS:

The present invention relates to a voltage boosting circuit suitable for use in an electronic watch or hand held calculator and especially to a boosting circuit which is suitable for incorporation integrated circuitry.

Figure 1:
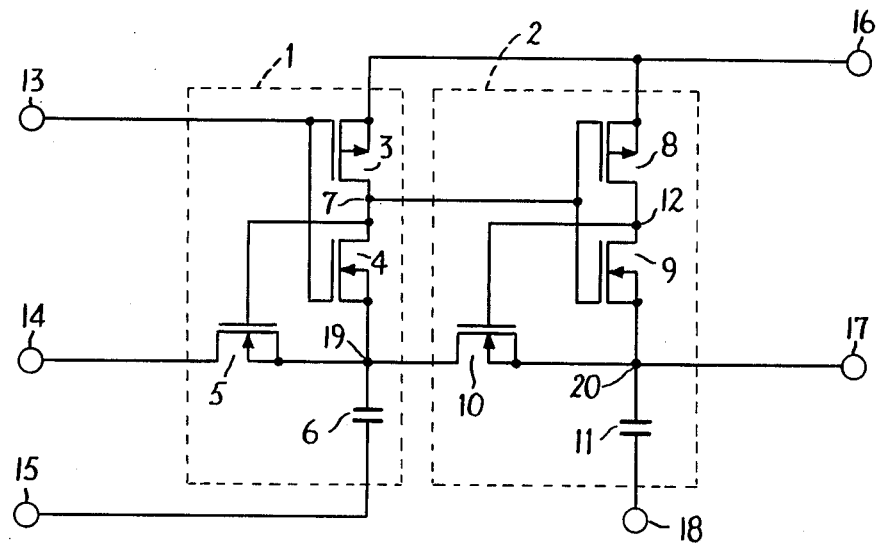
FIG. 1 is a circuit diagram of a voltage boosting circuit in accordance with the invention having two voltage boosting units.

FIG. 1 illustrates a two stage voltage boosting circuit in accordance with the invention comprising two boosting units 1 and 2 connected in series. Unit 1 comprises a P type MOS-FET 3 and an N type MOS-FET 4 connected so as to constitute an inverter. The gates of both of the MOS-FETs are connected to an input terminal 13. The source of MOS-FET 3 is connected to a power supply terminal 16. The source of MOS-FET 4 is connected through a connecting point 19 to one terminal of a condenser 6, the other terminal of which is connected to an input terminal 15. The source of the MOS-FET 4 is also connected through the connecting point 19 to the source of an N type MOS-FET 5, the gate of which is connected to the drains of MOS-FETs 3 and 4. The drain of MOS-FET 5 is connected to a voltage supply terminal 14.

The unit 2 comprises a P type MOS-FET 8 and an N type MOS-FET 9 which are connected so as to constitute an inverter. The gates of MOS-FETs 8 and 9 are connected through a connecting point 7 to the drains of MOS-FETs 3 and 4. The source of MOS-FET 8 is connected to the power supply terminal 16. The source of MOS-FET 9 is connected through a connecting point 20 to one terminal of a condenser 11, the other terminal of which is connected to a terminal 18. The source of MOS-FET 9 is also connected through the connecting point 20 to the source of an N type MOS-FET 10, the gate of which is connected through a connecting point 12 to the drains both of MOS-FETs 8 and 9. The drain of MOS-FET 10 is connected to the connecting point 19 of the first boosting unit 1.

Referring now to the connections of each of the terminals 13, 14, 15, 16, 17 and 18, the terminal 13 is a terminal to which an input signal is applied for driving the voltage boosting circuit. Such signal may for example be a divided signal from an oscillating circuit such as is available in a timepiece. Terminal 14 is connected to the low voltage point of a power source while terminals 16 and 18 are connected to the high voltage point of the power source. Terminal 15 is a terminal to which is applied a signal which is 180° out of phase with the signal applied to terminal 13. Terminal 17 is the output terminal of the voltage boosting circuit.

Figure 2:
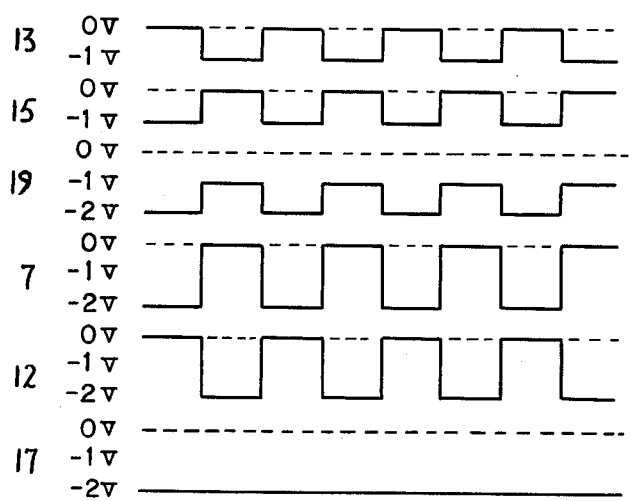
FIG. 2 shows diagrammatically the voltage forms of each portion of the circuit of FIG. 1.

The operation of the voltage boosting circuit shown in FIG. 1 will now be described with reference to FIG. 2 in which the waveforms are designated by the same reference numerals as the respective points of the circuit in FIG. 1.

Assuming that the power source is negative and has a voltage of 1 volt, the voltage of terminals 16 and 18 will be 0 volt and the voltage of terminal 14 will be −1 volt. The voltage of the terminal 17 will be about −1 volt by the charge of condenser 11 through the parasitic diode of N type MOS-FETs 5 and 10. Similarly, the voltage of connecting point 19 will be about −1 volt.

In this condition, when the voltage of input terminal 13 becomes −1 volt and the voltage of input terminal 15 becomes 0 volt, the P type MOS-FET 3 becomes to ON condition provided that its threshold voltage VTP is lower than 1 volt and N type MOS-FET 4 becomes to OFF condition as its source voltage is equal to the gate voltage. Therefore, the voltage of the connecting point 7 common to the drains of MOS-FETs 3 and 4 becomes 0 volt and N type MOS-FET 5 becomes to ON condition provided that its threshold voltage VTN is lower than 1 volt. Moreover, as the voltage of the connecting point 7 is 0 volt, P type MOS-FET 8 becomes to OFF condition and N type MOS-FET 9 becomes to ON condition. The source and gate voltages of N type MOS-FET 10 are equal to one another whereby MOS-FET 10 becomes to OFF condition.

As the voltage of terminal 15 is 0 volt, the condenser 6 is charged through the N type MOS-FET 5 which is in ON condition. The voltage of the connecting point 19 becomes −1 volt whereby the condenser 6 is given a charge corresponding to a drop of potential of 1 volt.

When the input signals are inverted so that the voltage of terminal 13 becomes 0 volt and the voltage of terminal 15 becomes −1 volt, P type MOS-FET 3 is changed to OFF condition and N type MOS-FET 4 is changed to ON condition. Therefore, the source and gate voltages of N type MOS-FET 5 are equal to one another whereby MOS-FET 5 becomes to OFF condition.

However, the condenser 6 does not suddenly discharge so that the voltage of terminal 19 is dropped to −2 volts when the voltage of terminal 15 is changed to 1 volt. Since MOS-FET 4 is in ON condition, the voltage of the terminal 7 of the first booster unit likewise becomes −2 volts. This causes P type MOS-FET 8 to change to ON condition and N type MOS-FET 9 to change to OFF condition. Therefore, the voltage of the connecting point 12 becomes 0 volt whereby N type MOS-FET 10 becomes to ON condition. Hence, the condenser 11 is charged through N type MOS-FET 10 so that the voltage of connecting point 20 and hence the voltage of terminal 17 becomes lower than −1 volt. At this time the first condenser 6 discharges.

When the input signals are again inverted so that the voltage of the input terminal 13 is −1 volt and the voltage of terminal 15 is 0 volt, the first condenser 6 is again charged and the stored charge is transferred to the second condenser 11.

Upon repetition of the described operations the condenser 11 is solely charged so that a voltage which is twice that of the power source is generated at the output terminal 17. Furthermore, if a load is connected between the terminals 16 and 17, the second condenser 11 is charged by the repeated switching operation in spite of discharge of the condenser 11 by the load so that an output voltage is maintained at a constant level.

According to the present invention, the MOS-FETs of the voltage boosting circuit are easily incorporated in the logic of an integrated circuit employed in an electronic timepiece or a hand held calculator whereby only the condensers need be provided as independent additional elements. Accordingly, the space required by the voltage boosting circuit for an electronic watch or calculator is remarkably reduced as is also the cost. Furthermore, it is possible to obtain more than twice the voltage of the power source by using additional boosting units.

Figure 3:
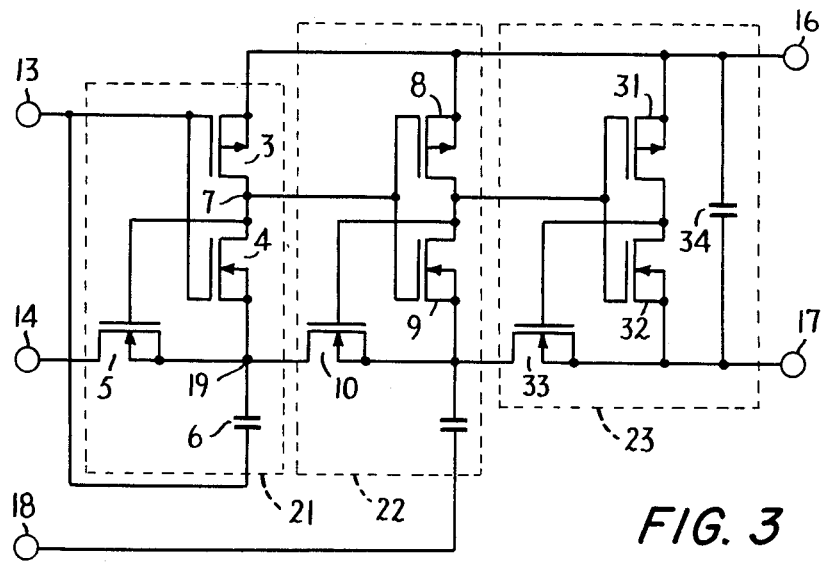
FIG. 3 is a circuit diagram of a voltage boosting circuit having three voltage boosting units.

Thus, for example FIG. 3 shows an embodiment of the invention having three voltage boosting units 21, 22 and 23 connected in series with one another. In units 21 and 22 corresponding parts have been designated by the same reference numerals as in FIG. 1. The third voltage boosting unit 23 in like manner comprises MOS-FETs 31, 32 and 33 and a condenser 34. The operation of the embodiment shown in FIG. 3 will be understood from the foregoing explanation of the operation of the embodiment of FIG. 1.

Figure 4:
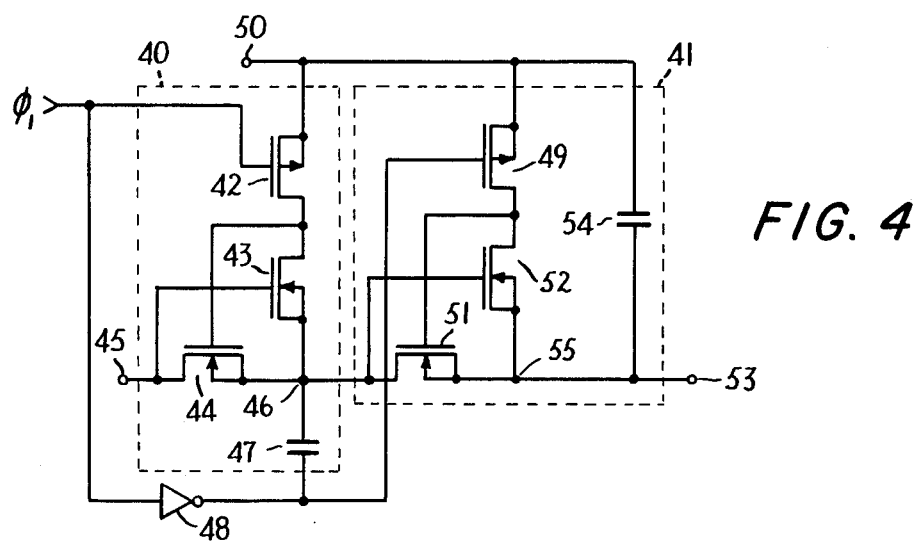
FIG. 4 is a circuit diagram of a voltage boosting circuit having two voltage boosting units.

FIG. 4 shows another embodiment of the invention comprising two voltage boosting units 40 and 41. The first boosting unit 40 comprises a P type MOS-FET 42 as a switching element. The source of P type MOS-FET 42 is connected to a high voltage point 50 of a standard voltage power source. An input pulse $\phi_1$ is applied to the gate of the P type MOS-FET 42. The gate of an N type MOS-FET 43 is connected to a low voltage point 45 of the standard voltage power source. The drains of MOS-FETs 42 and 43 are connected together and to the gate of an N type MOS-FET 44, the drain of which is connected to the low voltage terminal 45 of the standard voltage power source. The source of N type MOS-FET 43 is connected through a connection point 46 to the source of N type MOS-FET 44 and to one terminal of a condenser 47, the other terminal of which is connected through an inverter 48 to the input of pulse $\phi_1$. Thus, an inverted signal of the input pulse $\phi_1$ is applied to the connecting point 46 through the inverter 48 and the condenser 47.

The second boosting unit 41 has a P type MOS-FET 49 of which the source is connected to the high voltage point 50 of the standard voltage power source. An inverted signal of the input pulse $\phi_1$ is applied to the gate of P type MOS-FET 49 through the inverter 48. The second boosting unit further comprises an N type MOS-FET 52, the gate of which is connected to the connection point 46 of the first boosting unit. The drains of MOS-FETs 49 and 52 are connected together and to the gate of an N type MOS-FET 51, the drain of which is connected to the connection point 46 of the first boosting unit. The source of N type MOS-FET 52 is connected through a connecting point 55 to the source of N type MOS-FET 51 and to one terminal of a condenser 54, the other terminal of which is connected to the high voltage point 50 of the standard power source. The connecting point 55 is also connected to an output terminal 53.

The operation of the voltage boosting circuit shown in FIG. 4 will now be described with reference to the accompanying waveforms shown in FIG. 5.

Figure 5:
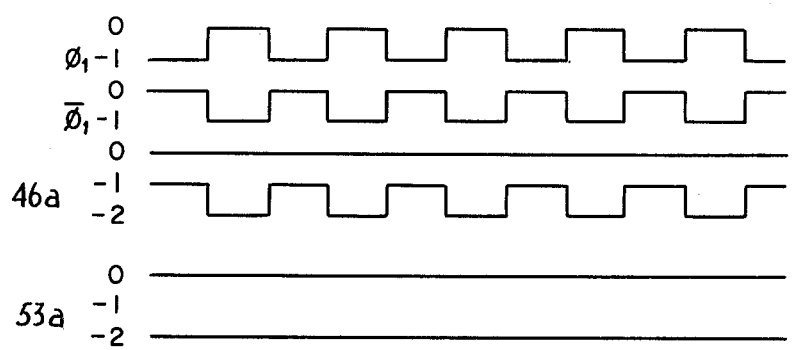
FIG. 5 shows waveforms for explaining the operation of the circuit of FIG. 4.

An input pulse $\phi_1$ of the waveform shown in FIG. 5 is applied to the gate electrode of the P type MOS-FET 42 of the first boosting unit 40 and an inverted signal $\overline{\phi}_1$ is applied by the inverter 48 to the gate of the P type MOS-FET 49 of the second boosting unit 41 and also to the condenser 47. In this condition, if the voltage of high voltage point 50 of the standard power source is 0 volt and the voltage of the low voltage point 45 is −1 volt, the P type MOS-FET 42 becomes to ON condition when the voltage of input pulse $\overline{\phi}_1$ is −1 volt. Further, N type MOS-FET 44 becomes to ON condition whereby the voltage of the connecting point 46 becomes −1 volt. At this time, the voltage of the condenser 47 in the output side of the inverter 48 is 0 volt. Thereafter, when the voltage of input pulse $\phi_1$ is changed to 0 volt, P type MOS-FET 42 changes to OFF condition, the voltage of the connecting point 46 is lowered to −2 volts according to a changed voltage of −1 volt of condenser 47 in the output side of inverter 48. N type MOS-FET 44 becomes to OFF condition and N type MOS-FET 43 becomes to ON condition.

When the voltage of input pulse $\phi_1$ is changed to −1 volt, P type MOS-FET 42 and N type MOS-FET 44 become to ON condition whereby the voltage of connecting point 46 is changed to −1 volt according to the OFf condition of N type MOS-FET 43. FIG. 5 shows the change of voltage of the connecting point 46 by waveform 46a.

In the second boosting unit 41 when the voltage of the inverted input pulse $\overline{\phi}_1$ applied to the gate electrode of P type MOS-FET 49 is −1 volt, P type MOS-FET 49 becomes to ON condition and N type MOS-FET 51 also becomes to ON condition. Therefore, the voltage of the output terminal 53 becomes −2 volts (at this time the voltage of the connecting point 46 is −2 volts). Thereafter, when the voltage of the inverted input pulse $\overline{\phi}_1$ becomes 0 volt, P type MOS-FET 49 and N type MOS-FET 51 become to OFF condition and N type MOS-FET 52 becomes to ON condition.

In this condition, no electric power is applied to the output terminal 53. However, the voltage of the output terminal 53 is maintained at −2 volts by the charge of the charged condenser 54. FIG. 5 shows a waveform 53a which represents the voltage of the output terminal 53. It will thus be seen that the voltage is boosted by a factor of 2 by connecting the first boosting unit 40 and the second boosting unit 41 in series.

Figure 6:
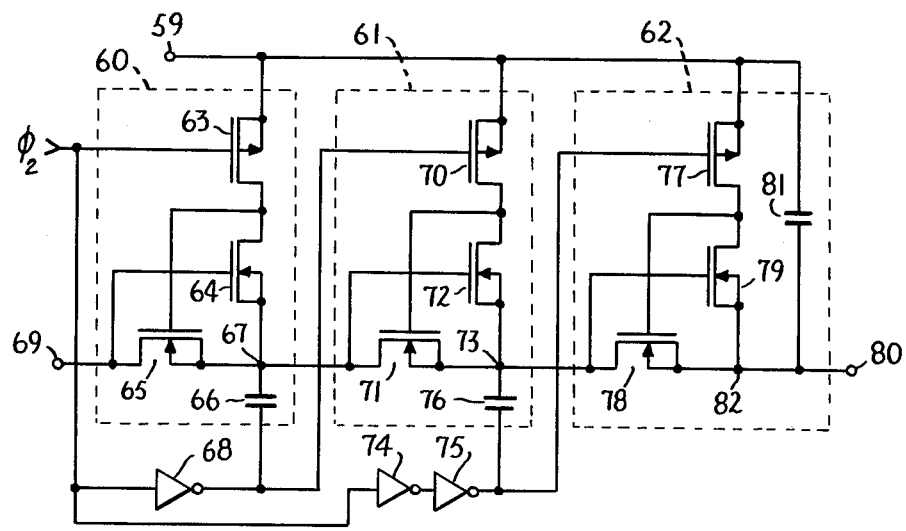
FIG. 6 is a circuit diagram of a voltage boosting circuit having three voltage boosting units.

FIG. 6 shows a further embodiment of a boosting circuit in accordance with the present invention for obtaining a voltage boosted by the factor of 3. The embodiment illustrated in FIG. 6 comprises a first boosting unit 60, a second boosting unit 61 and a third boosting unit 62. The first boosting unit 60 has a P type MOS-FET 63 as a switching element of which the source is connected to a high voltage point 59 of a standard voltage power source. An input pulse $\phi_2$ is applied to the gate electrode of the P type MOS-FET 63. The first boosting unit 60 further comprises an N type MOS-FET 64, the gate of which is connected to a low voltage point 69 of the standard power source. The drains of MOS-FETs 63 and 64 are connected together and to the gate of an N type MOS-FET 65, the drain of which is connected to the low voltage point 69 of the standard voltage power source. The source of N type MOS-FET 64 is connected through a connecting point 67 to the source of N type MOS-FET 65 and to one terminal of a condenser 66, the other terminal of which is connected through an inverter 68 to the input of the input pulse $\phi_2$.

The second voltage boosting unit 61 has a P type MOS-FET 70 as a switching element, the source of which is connected to the high voltage point 59 of the standard voltage power source. The input pulse $\phi_2$ is applied to the gate electrode of the P type MOS-FET 70 through the inverter 68. The second boosting unit 61 further comprises an N type MOS-FET 72, the gate of which is connected to the connecting point 67 of the first boosting unit 60. The drains of MOS-FETs 70 and 72 are connected together and to the gate of an N type MOS-FET 71, the drain of which is connected to the connecting point 67 of the first boosting unit. The source of N type MOS-FET 72 is connected through a connecting point 73 to the source of the N type MOS-FET 71 and to one terminal of a condenser 76, the other terminal of which is connected through inverters 74 and 75 to the input of input signal $\phi_2$. Thus, the input pulse $\phi_2$ is applied to the connecting point 73 through inverters 74 and 75 and condenser 76.

The third boosting unit 62 similarly to the second boosting unit 61 has a P type MOS-FET 77 as a switching element the source of which is connected to the high voltage point 59 of the standard voltage power source. A pulse signal generated by the inverter 75 is applied to the gate of the P type MOS-FET 77. The third boosting unit 62 further comprises an N type MOS-FET 79, the gate of whic is connected to the connecting point 73 of the second boosting unit. The drains of MOS-FETs 77 and 79 are connected to the gate of an N type MOS-FET 78, the drain of which is connected to the connecting point 73 of the second boosting unit 61. The source of N type MOS-FET 79 is connected through a connecting point 82 to the source of N type MOS-FET 78 and to one terminal of a condenser 81, the other terminal of which is connected to the high voltage point 59 of the standard voltage power source. The connecting point 82 and hence one terminal of the condenser 81 are connected to an output terminal 80.

The operation of the embodiment of the present invention shown in FIG. 6 will now be explained with reference to the accompanying waveforms shown in FIG. 7.

Figure 7:
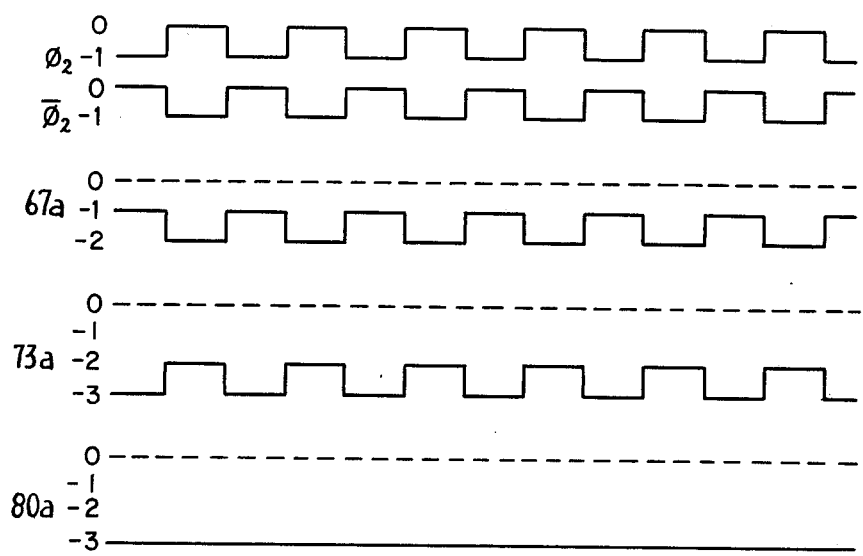
FIG. 7 shows waveforms for explaining the operation of the circuit of FIG. 6.

An input pulse $\phi_2$ as indicated by the waveform $\phi_2$ in FIG. 7 is applied to the gate of the P type MOS-FET 63 of the first boosting unit 60. A pulse having the same phase as the waveform $\phi_2$ is applied to the gate electrode of the P type MOS-FET 77 of the third boosting unit 62 and to the condenser 76 of the second boosting unit. An inverted input pulse $\overline{\phi}_2$ which is 180° out of phase with the input pulse $\phi_2$ as indicated by the waveform $\overline{\phi}_2$ is applied through the inverter 68 to the gate of P type MOS-FET 70 of the second boosting unit and to the condenser 66 of the first boosting unit.

In this condition, if the voltage of the high voltage point 59 of the standard voltage power source is 0 volt, and if the voltage of the low voltage point 69 of the power source is −1 volt, a signal as indicated by the waveform 67a is generated at the connecting point 67 by the input pulse $\phi_2$ which is sequentially operated to 0 volt and −1 volt. This signal is applied to the drain electrode of N type MOS-FET 71 and to the gate of N type MOS-FET 72 in the second boosting unit 61. If the voltage of the inverted input pulse $\overline{\phi}_2$ is −1 volt, P type MOS-FET 70 becomes to ON condition and N type MOS-FET 71 also becomes to ON condition. At this time, the voltage of the connecting point 67 is −2 volts, whereby the voltage of the connecting point 73 of the second boosting unit is also −2 volts since N type MOS-FET 71 is in ON condition.

When the voltage of the inverted impulse pulse $\overline{\phi}_2$ is changed to 0 volt, the P type MOS-FET 70 and N type MOS-FET 71 become to OFF condition and N type MOS-FET 72 changes to ON condition. At this time the voltage of the output of the inverter 75 changes from 0 volt to −1 volt whereby the voltage of the terminal 73 through the condenser 76 changes from −2 volts to −3 volts. The change of voltage of the connecting point 73 is indicated by the waveform 73a in FIG. 7. The voltage change of the connecting point 73 is applied to the drain electrode of N type MOS-FET 78 and to the gate of N type MOS-FET 79 in the third boosting unit 62. If the input pulse $\phi_2$ applied to the gate electrode of P type MOS-FET 77 is −1 volt, P type MOS-FET 77 becomes to ON condition and N type MOS-FET 78 also becomes to ON condition. A voltage of −3 volts is then generated at the connecting point 73 and is applied to the output terminal 80 through the N type MOS-FET 78 which is in ON condition. The voltage at the output terminal 80 is maintained by the charge on the condenser 81.

Further, when the voltage of the input pulse applied to the P type MOS-FET 77 changes to 0 volt and P type MOS-FET 77 and N type MOS-FET 78 thereby change to OFF condition, the voltage at the output terminal 80 is maintained at −3 volts, as indicated by the waveform 80a. It is thus possible to obtain a voltage boosted by the factor 3 by connecting the first, second and third boosting units 60, 61 and 62 respectively in series with one another.

Figure 8:
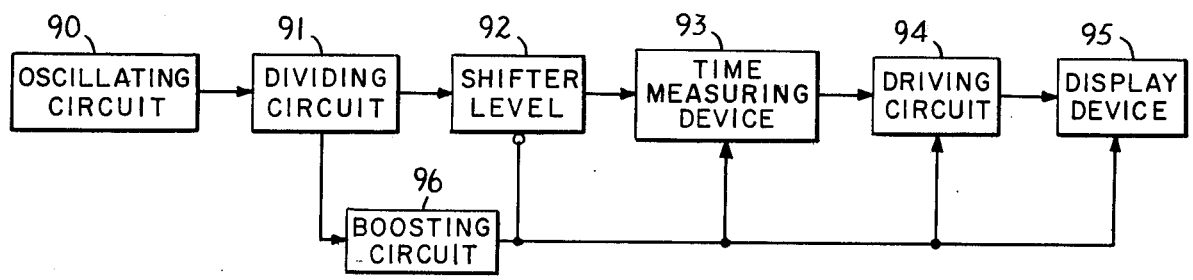
FIG. 8 is a block diagram of the circuitry of an electronic watch using a boosting circuit in accordance with the present invention.

FIG. 8 is a block diagram showing the circuitry of an electronic watch having a boosting circuit in accordance with the present invention. The signal produced by an oscillating circuit 90 having a quartz element is divided by a dividing circuit 91 to obtain a 1 Hz standard pulse which is applied to a level shifter 92. A divided signal generated from a selected one of the dividing steps of the dividing circuit 91 is applied to a boosting circuit 96 as an input pulse. The boosting circuit 96 generates a voltage which is three times the standard voltage. This boosted voltage is applied to the level shifter 92, a time measuring device 93, a driving circuit 94 and a display device 95. The level shifter 92 shifts the level of the standard pulse from the dividing circuit 91 and applies it to the time measuring device 93. The time measuring device 93 generates a counting signal corresponding to the time and applies the counting signal to the driving circuit 94 after changing the counting signal to a selected code for operating the display device 95, for example a digital display device in which the digits are composed in known manner of seven segments. The driving circuit 94 amplifies the signal and applies it to the display device 95.

As will be understood by those skilled in the art, many variations and modifications of the embodiments illustrated by way of example in the drawings may be made and hence the invention is in no way limited to these embodiments.

According to the invention, the boosting circuit is composed of a plurality of boosting units, each comprised of MOS-FETs and a condenser, whereby it is possible to obtain a smaller boosting unit than with a conventional boosting unit having diodes. Furthermore, it is possible to mount the boosting unit on the same chip with other circuitry. As the voltage of the commonly connected source electrodes of the first and second MOS-FETs of one unit is employed as the standard voltage of the next boosting unit, it is possible easily to obtain a desired boosting magnification by connecting a plurality of the boosting units in sequence with each other.

What I claim is:

1. A voltage boosting circuit comprising a plurality of boosting units connected in series, each of said units comprising a condenser and an MOS-FET, said MOS-FET of a first unit being connected between one terminal of said condenser and one terminal of a power source so as to connect said terminal with said power source when said MOS-FET is conductive and said MOS-FET of a succeeding unit being connected between said terminal of said condenser of the preceeding unit and one terminal of said condenser of said succeeding unit so as to connect said terminals of said condenser when said MOS-FET is conductive, and means for switching said MOS-FET, said switching means of each said unit comprising a second MOS-FET having a source connected to the opposite terminal of said power source, a third MOS-FET having a source connected to the source of said first mentioned MOS-FET and to one terminal of said condenser, means connecting the drains of said second and third MOS-FETs to the gate of said first mentioned MOS-FET and means for applying a pulse signal to the gates of said second and third MOS-FETs.

2. A voltage boosting circuit according to claim 1, further comprising means for applying to the other terminal of said condenser a pulse signal which is 180° out of phase with said first mentioned pulse signal.

3. A voltage boosting circuit comprising a plurality of boosting units connected in series, each of said units comprising a condenser and an N type MOS-FET,
   said MOS-FET of a first unit being connected between one terminal of said condenser and the low voltage point of a power source so as to connect said terminal with said power source when said MOS-FET is conductive, and
   said MOS-FET of a succeeding unit being connected between said terminal of said condenser of the preceeding unit and one terminal of said condenser of said succeeding unit so as to connect said terminals of said condenser when said MOS-FET is conductive, and
   means for switching said MOS-FET of each unit, said switching means comprises a second MOS-FET having a source connected with the high voltage point of said power source, a third MOS-FET having a source connected to the source of said first mentioned MOS-FET and to one terminal of said condenser, means connecting the drains of said second and third MOS-FETs to the gate of said first mentioned MOS-FET, means for applying a signal pulse to the gate of said second MOS-FET, and means for connecting the gate of said third MOS-FET and the drain of said first mentioned MOS-FET to the low voltage point of said power source.

4. A voltage boosting circuit according to claim 3, in which said signal pulse applying means includes means for applying signals of opposite phase to the gates of said second MOS-FETs of successive units in said series.

5. A voltage boosting circuit according to claim 4, which comprises three of said units connected in series.

6. A voltage boosting circuit for an electric watch comprising in combination:
   a first voltage boosting unit comprising a first switching means composed of P and N types FETs, a second switching means controlled by an output of said first switching means, a first condenser having one terminal connected to at least said second switching means, a first input terminal connected to said first switching means and having a first clock signal applied thereto, a second input terminal connected to said second switching means and having a DC power source applied thereto, and a third input terminal connected to the other terminal of said condenser and having a second clock signal with a phase difference of 180° from said first clock signal applied thereto,
   a second voltage boosting unit comprising a third switching means composed of P and N types, FETs, a fourth switching means controlled by an output of said third switching means, a second condenser having one terminal connected at least to said fourth switching means, means for applying a third clock signal to said third switching means, means connecting said fourth switching means with a connecting point between said second switching means and said one terminal of said first condenser, means connecting the other terminal of said second condenser and a booster output terminal connected with a connecting point between said fourth switching means and said second condenser, an electric charge kept in said first condenser of said first voltage boosting unit being transferred to said second condenser when said second switching means is turned OFF and said fourth switching means is turned ON, whereby a DC voltage is obtained at said output terminal which is at least twice that of the input DC power source.

7. A voltage boosting circuit according to claim 6, in which one terminal of said first switching means in said first voltage boosting unit is connected to a connecting point between said first condenser and said second switching means, one terminal of said third switching means in said second voltage boosting unit is connected to one terminal of said first switching means, and another terminal of said third switching means is connected to a connecting point between said fourth switching means and said second condenser.

* * * * *